(12) United States Patent
Lai

(10) Patent No.: US 10,560,387 B2
(45) Date of Patent: Feb. 11, 2020

(54) METHOD FOR ADJUSTING MANNER OF ISSUING ACKNOWLEDGEMENT FOR DOWNLOADING DATA AND ELECTRONIC DEVICE USING THE SAME

(71) Applicant: Chiun Mai Communication Systems, Inc., New Taipei (TW)

(72) Inventor: Yi-Tung Lai, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 284 days.

(21) Appl. No.: 15/651,021

(22) Filed: Jul. 17, 2017

(65) Prior Publication Data

US 2018/0034739 A1    Feb. 1, 2018

(30) Foreign Application Priority Data

Jul. 26, 2016 (CN) .......................... 2016 1 0593372

(51) Int. Cl.
| | |
|---|---|
| *H04L 1/18* | (2006.01) |
| *H04L 29/08* | (2006.01) |
| *H04L 12/855* | (2013.01) |
| *H04L 5/00* | (2006.01) |
| *H04L 12/801* | (2013.01) |
| *H04L 29/06* | (2006.01) |
| *H04L 12/825* | (2013.01) |
| *H04L 12/807* | (2013.01) |

(52) U.S. Cl.
CPC ........ *H04L 47/2466* (2013.01); *H04L 1/1825* (2013.01); *H04L 1/1854* (2013.01); *H04L 5/0055* (2013.01); *H04L 47/29* (2013.01); *H04L 69/163* (2013.01); *H04L 69/324* (2013.01); *H04L 47/25* (2013.01); *H04L 47/27* (2013.01)

(58) Field of Classification Search
CPC . H04L 1/1825; H04L 1/1854; H04L 47/2466; H04L 47/25; H04L 47/27; H04L 47/29; H04L 5/0055; H04L 69/163; H04L 69/324

See application file for complete search history.

(56) References Cited

U.S. PATENT DOCUMENTS

| | | | |
|---|---|---|---|
| 2004/0148387 A1* | 7/2004 | Sethi | H04L 47/10 709/224 |
| 2010/0165920 A1* | 7/2010 | Chen | H04W 72/1231 370/328 |
| 2012/0275404 A1 | 11/2012 | Jung et al. | |
| 2017/0126574 A1* | 5/2017 | Goel | H04L 43/0882 |

* cited by examiner

*Primary Examiner* — Andrew Lai
*Assistant Examiner* — M Mostazir Rahman
(74) *Attorney, Agent, or Firm* — ScienBiziP, P.C.

(57) ABSTRACT

An electronic device which is able to acknowledge downloaded data packets at a maximum download speed includes at least one processor and a storage device. The resource allocations of a physical layer of a network are obtained, and a transmission volume of a download link of the physical layer is calculated. The rate of issuing and transmitting acknowledgments through an upload link, based on respective sizes of data packets and acknowledgments, is also calculated. A determination is made as to whether the rate of issuing acknowledgments per download packets should be changed to achieve effectively equal speed of issuing acknowledgments through the upload link and the manner of the issue is adjusted accordingly.

9 Claims, 2 Drawing Sheets

METHOD FOR ADJUSTING MANNER OF ISSUING ACKNOWLEDGEMENT FOR DOWNLOADING DATA AND ELECTRONIC DEVICE USING THE SAME

CROSS-REFERENCE TO RELATED DISCLOSURES

This disclosure claims priority to Chinese Patent Application No. 201610593372.9 filed on Jul. 26, 2016, the contents of which are incorporated by reference herein.

FIELD

The subject matter herein generally relates to data transmission and, more particularly, to a method for adjusting manner of issuing acknowledgement for downloading data.

BACKGROUND

During a data transmission process in a network, after downloading a data packet from the network, an acknowledgment (ACK) for the downloaded data is commonly required from the receiving electronic device. When an obvious gap exists between an uplink bandwidth and a downlink bandwidth, the uplink bandwidth may be not wide enough to send the ACK. This may lead to the transmission of the ACK being delayed (as pending in the network) and only a certain number of the ACKs can be successfully sent. Downloading speed is thereby limited. For example, the full speed for downloading data based on the downlink bandwidth may be promoted as one hundred data packets per second, but the speed of uploading ACKs based on the uplink bandwidth can be only thirty ACKs per second. The actual downloading speed will be limited to be thirty data packets per second, and some data packets need to be held in a delay window.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
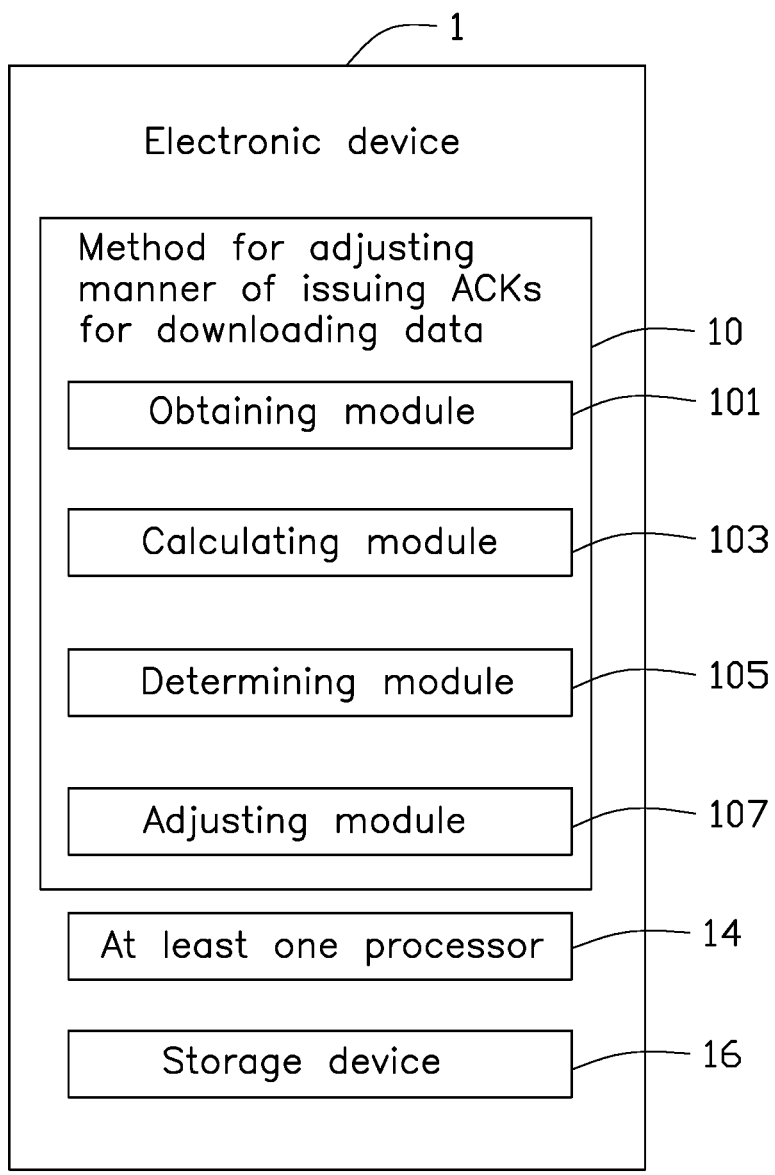
FIG. 1 is a block diagram of an example embodiment of an electronic device including a system for adjusting manner of issuing and transmitting acknowledgments in reply when downloading data.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

FIG. 1 shows an example embodiment of an electronic device 1 including a system 10 for adjusting manner of issue and transmission of acknowledgements (ACKs) when downloading data. The system 10 can be installed and operated in the electronic device 1. In at least one embodiment, the electronic device 1 can be a smartphone, a personal digital assistant (PDA), a tablet computer, or other electronic device. The system 10 is used to dynamically adjust the manner of issue and transmission of ACKs before downloading data according to loading states (e.g. bandwidths) of a upload link and a download link, thereby increasing a speed of downloading data. The electronic device 1 further includes, but is not limited to, at least one processor 14 and a storage device 16. FIG. 1 illustrates only one example of the electronic device, other examples can include more or fewer components than as illustrated, or have a different arrangements of the various components in other embodiments.

In at least one embodiment, the at least one processor 14 can be a central processing unit (CPU), a microprocessor, or other data processor chip that performs functions of the electronic device 1. The storage device 16 can include various types of non-transitory computer-readable storage mediums. For example, the storage device 16 can be an internal storage system, such as a flash memory, a random access memory (RAM) for temporary storage of information, and/or a read-only memory (ROM) for permanent storage of information. The storage device 16 can also be an external storage system, such as a hard disk, a storage card, or a data storage medium.

In at least one embodiment, the system 10 can include an obtaining module 101, a calculating module 103, a determining module 105, and an adjusting module 107. The function modules comprise of the obtaining module 101, the calculating module 103, the determining module 105, and the adjusting module 107 can include computerized codes in the form of one or more programs, which are stored in the storage device 16. The at least one processor 14 executes the computerized codes to provide functions of the obtaining module 101, the calculating module 103, the determining module 105, and the adjusting module 107.

The electronic device 1 can connect to at least one network. The obtaining module 101 is configured to obtain a resource allocation of a physical layer of the at least one network. The resource allocation includes, but is not limited to, a first bandwidth of the upload link and a second bandwidth of the download link.

The calculating module 103 is configured to calculate a first quantity of data packets that can be transmitted in the download link and a second quantity of ACKs that can be transmitted in the upload link, according to the resource allocation of the physical layer. The module 103 further calculates a rate of issuing ACKs according to the first quantity and the second quantity.

In this embodiment, the calculating module 103 calculates a transmission volume $T_{put\_DL}$ of the download link, and then calculates a size $N_{DL\_data\_size}$ of each downloaded data packet packed in the physical layer, so as to obtain the first quantity of data packets transmitted in the download link. The calculating module 103 also calculates a transmission volume $T_{put\_UL}$ of the upload link, and then calculates a size $N_{DL\_ACK\_size}$ of each ACK packed in the physical layer in response to at least one of the data packets so as to obtain the second quantity of ACKs transmitted in the upload link. After that, the calculating module 103 calculates the rate R of issuing ACKs according to the first quantity and the second quantity.

In this embodiment, the calculating module 103 determines the rate (R) of issuing ACKs according to the formula below:

$$R=T_{put\_DL}/N_{DL\_data\_size})/(T_{put\_UL}/N_{DL\_ACK\_size})$$

The determining module 105 determines whether the manner of issuing ACKs needs to be adjusted. In this embodiment, when the rate of issuing ACKs is changed, the determining module 105 determines that the manner of issuing ACKs needs to be adjusted, and when the rate of issuing ACKs is unchanged, the determining module 105 determines that the manner of issuing ACKs does not need to be adjusted.

The adjusting module 107 is configured to adjust the manner of issuing ACKs according to the determination of determining whether the manner of issuing ACKs needs to be adjusted. In this embodiment, the manner of issuing ACKs adjusted by the adjusting module 107 is to issue one ACK in response to N downloaded data packets, wherein, when R is an integer, N is equal to R, and when R is a decimal, N is equal to 1 plus a nearest integer to which R is rounded down. For example, a full speed download (e.g. 100 M bps) may be one hundred data packets per second, but the speed of uploading ACKs (e.g. 1 M bps) is only thirty ACKs per second. The calculating module 103 calculates that R is 3.3, rounds down R to 3, and obtains 4 by adding 3 to 1. Therefore, the manner of issuing ACKs adjusted by the adjusting module 107 is to issue one ACK per four downloaded data packets. As such, the ACKs can be uploaded effectively at the same time as data packets are downloaded, and the speed of downloading data can then reach 100 M bps.

Figure 2:
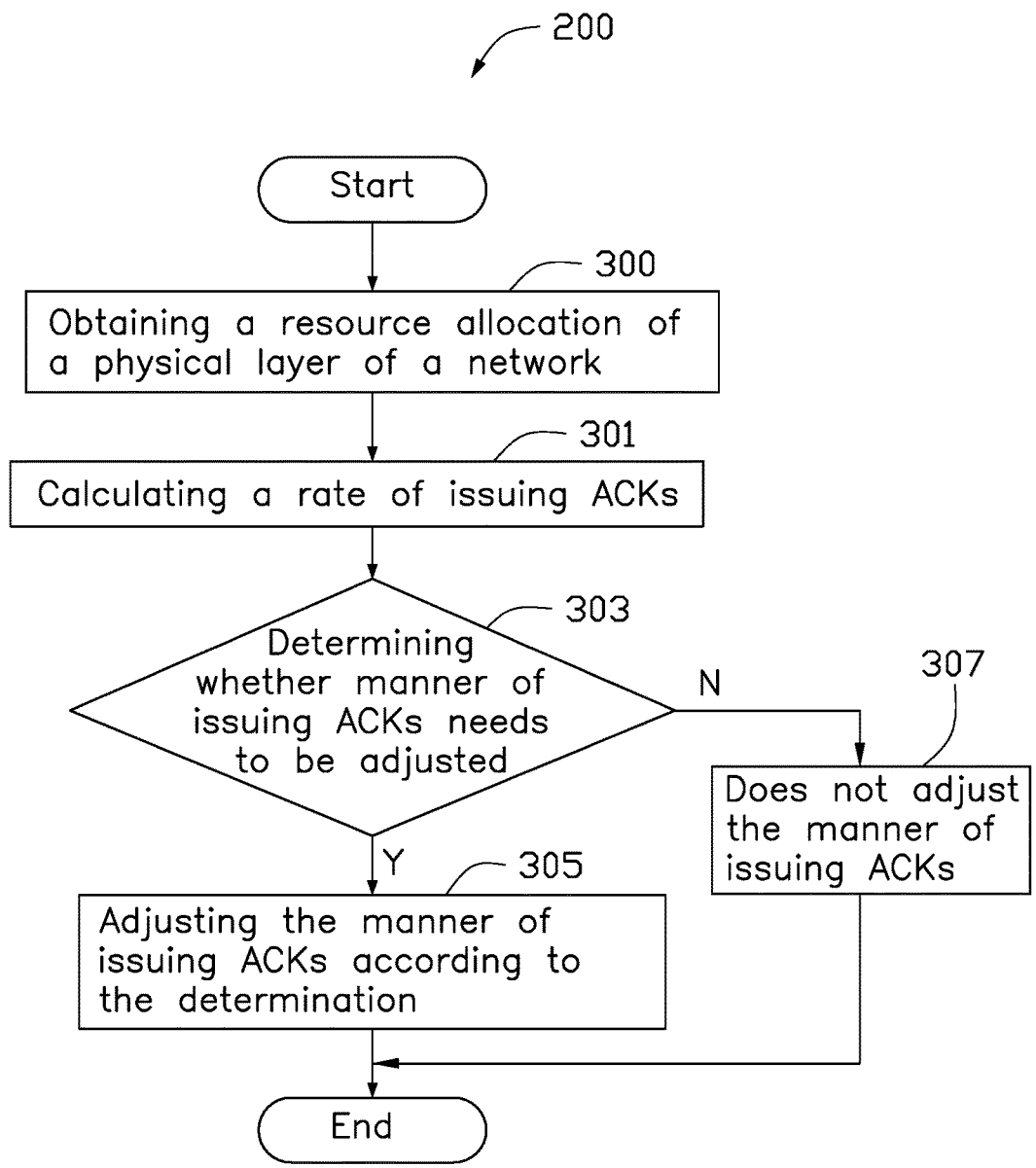
FIG. 2 is a flowchart of an example embodiment of a method for adjusting manner of issue and transmission of acknowledgments in reply when downloading data, in the electronic device of FIG. 1.

FIG. 2 illustrates a flowchart of an example embodiment of a method 200 for adjusting manner of issuing ACK for downloading data in the electronic device of FIG. 1. In at least one embodiment, the method 200 is provided by way of example, as there are a variety of ways to carry out the method 200. The method 200 described below can be carried out using the allocations illustrated in FIG. 1, for example, and various elements of these figures are referenced in explaining example method. Each block shown in FIG. 2 represents one or more processes, methods, or subroutines, carried out in the exemplary method. Furthermore, the illustrated order of blocks is by example only and the order of the blocks can change. The exemplary method can begin at block 300. Depending on the embodiment, additional steps can be added, others removed, and the ordering of the steps can be changed.

At block 300, the obtaining module 101 obtains a resource allocation of a physical layer of the network. The resource allocation includes, but is not limited to, a first bandwidth of an upload link and a second bandwidth of a download link.

At block 301, the calculating module 103 calculates a first quantity of data packets that can be handled by the download link and a second quantity of ACKs that can be transmitted by the upload link, according to the resource allocation of the physical layer. The module 103 further calculates a rate of issuing ACKs according to the first quantity and the second quantity.

In this embodiment, the calculating module 103 calculates a transmission volume $T_{put\_DL}$ of the download link, and then calculates a size $N_{DL\_data\_size}$ of each downloaded data packet packed in the physical layer, so as to obtain the first quantity of data packets transmitted in the download link. The calculating module 103 also calculates a transmission volume $T_{put\_UL}$ of the upload link, and then calculates a size $N_{DL\_ACK\_size}$ of each ACK packed in the physical layer in response to at least one of the data packets, so as to obtain the second quantity of ACKs transmitted in the upload link. After that, the calculating module 103 calculates the rate R of issuing ACKs according to the first quantity and the second quantity.

In this embodiment, the calculating module 103 determines the rate (R) of issuing ACKs according to the formula below:

$$R=T_{put\_DL}/N_{DL\_data\_size})/(T_{put\_UL}/N_{DL\_ACK\_size})$$

At block 303, the determining module 105 determines whether the manner of issuing ACKs needs to be adjusted. If it does, go to block 305. If it does not, go to block 307. In this embodiment, when the rate of issuing ACKs is changed, the determining module 105 determines that the manner of issuing ACKs needs to be adjusted, and when the rate of issuing ACKs is unchanged, the determining module 105 determines that the manner of issuing ACKs does not need to be adjusted.

At block 305, the adjusting module 107 adjusts the manner of issuing ACKs, according to the determination of determining whether the manner of issuing ACKs needs to be adjusted. In this embodiment, the manner of issuing ACKs adjusted by the adjusting module 107 is to issue one ACK in response to N downloaded data packets, wherein, when R is an integer, N is equal to R, and when R is a decimal, N is equal to 1 plus a nearest integer to which R is rounded down. For example, a full speed download (e.g. 100 M bps) may be one hundred data packets per second, but the speed of uploading ACKs (e.g. 1 M bps) is only thirty ACKs per second. The calculating module 103 calculates that R is 3.3, rounds down R to 3, and obtains 4 by adding 3 to 1. Therefore, the manner of issuing ACKs adjusted by the adjusting module 107 is to issue one ACK per four downloaded data packets. As such, the ACKs can be uploaded effectively at the same time as data packets are downloaded, and the speed of downloading data can then reached 100 M bps.

At block 307, the adjusting module 107 does not need to adjust the manner of issuing ACKs. The current manner of issuing ACKs can be continuously used.

The method for adjusting the manner of issuing ACKs can dynamically adjust the manner of issuing ACKs according the first quantity of the data packets that can be handled by the download link and the second quantity of the ACKs that can be transmitted by the upload link and can issue one ACK per multiple data packets being downloaded. Therefore, data transmission problem such as pending of ACKs for downloading data because of an extreme imbalance of between an uplink bandwidth and an downlink bandwidth can be solved.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
   at least one processor; and
   a storage device that stores one or more programs, which when executed by the at least one processor, cause the at least one processor to:
   obtain a resource allocation of a physical layer of a network;
   calculate a transmission volume of a download link of the physical layer, calculate a size of each downloaded data packet packed in the physical layer, and obtain a first quantity of data packets transmitted in the download link;
   calculate a transmission volume of an upload link of the physical layer, calculate a size of each ACK packed in the physical layer in response to at least one of the data packets, and obtain a second quantity of ACKs transmitted in the upload link;
   calculate a rate of issuing ACKs according to the first quantity and the second quantity;
   determine whether a manner of issuing ACKs needs to be adjusted according to the rate of issuing ACKs; and
   adjust the manner of issuing ACKs according to a determination of determining whether the manner of issuing ACKs needs to be adjusted; wherein the at least one processor determines the rate of issuing ACKs according to formula $R=(T_{put\_DL}/N_{DL\_data\_size})/(T_{put\_UL}/N_{DL\_ACK\_size})$, wherein R represents the rate of issuing ACKs, $T_{put\_DL}$ represents the transmission volume of the download link, $N_{DL\_data\_size}$ represents the size of each downloaded data packet packed in the physical layer, $T_{put\_UL}$ represents the transmission volume of the upload link, and $N_{DL\_ACK\_size}$ represents the size of each ACK.

2. The electronic device according to claim 1, wherein when the rate of issuing ACKs is changed, the at least one processor determines that the manner of issuing ACKs needs to be adjusted, and when the rate of issuing ACKs is unchanged, the at least one processor determines that the manner of issuing ACKs does not need to be adjusted.

3. The electronic device according to claim 2, wherein the at least one processor adjusts the manner of issuing ACKs to issue one ACK in response to N downloaded data packets, wherein, when R is an integer, N is equal to R, and when R is a decimal, N is equal to 1 plus a nearest integer to which R is rounded down.

4. A computer-implemented method for adjusting manner of issuing ACKs for downloading data, the method comprising:
   obtaining a resource allocation of a physical layer of a network;
   calculating a transmission volume of a download link of the physical layer, calculating a size of each downloaded data packet packed in the physical layer, and obtaining a first quantity of data packets transmitted in the download link;
   calculating a transmission volume of an upload link of the physical layer, calculating a size of each ACK packed in the physical layer in response to at least one of the data packets, and obtaining a second quantity of ACKs transmitted in the upload link;
   calculating a rate of issuing ACKs according to the first quantity and the second quantity;
   determining whether manner of issuing ACKs needs to be adjusted according to the rate of issuing ACKs; and
   adjusting the manner of issuing ACKs according to a determination of determining whether the manner of issuing ACKs needs to be adjusted; wherein the rate of issuing ACKs is determined according to formula $R=(T_{put\_DL}/N_{DL\_data\_size})/(T_{put\_UL}/N_{DL\_ACK\_size})$, wherein, R represents the rate of issuing ACKs, $T_{put\_DL}$ represents the transmission volume of the download link, $N_{DL\_data\_size}$ represents the size of each downloaded data packet packed in the physical layer, $T_{put\_UL}$ represents the transmission volume of the upload link, and $N_{DL\_ACK\_size}$ represents the size of each ACK.

5. The computer-implemented method according to claim 4, wherein when the rate of issuing ACKs is changed, it is determined that the manner of issuing ACKs needs to be adjusted, and when the rate of issuing ACKs is unchanged, it is determined that the manner of issuing ACKs does not need to be adjusted.

6. The computer-implemented method according to claim 5, wherein the manner of issuing ACK is to issue one ACK in response to N downloaded data packets, wherein, when R is an integer, N is equal to R, and when R is a decimal, N is equal to 1 plus a nearest integer to which R is rounded down.

7. A non-transitory storage medium having stored thereon instructions that, when executed by a processor of an electronic device, causes the processor to perform a method for adjusting manner of issuing ACKs for downloading data, wherein the method comprises:
   obtaining a resource allocation of a physical layer of a network;
   calculating a transmission volume of a download link of the physical layer, calculating a size of each downloaded data packet packed in the physical layer, and obtaining a first quantity of data packets transmitted in the download link;
   calculating a transmission volume of an upload link of the physical layer, calculating a size of each ACK packed in the physical layer in response to at least one of the data packets, and obtaining a second quantity of ACKs transmitted in the upload link;
   calculating a rate of issuing ACK according to the first quantity and the second quantity;
   determining whether a manner of issuing ACKs needs to be adjusted according to the rate of issuing ACKs; and
   adjusting the manner of issuing ACKs according to a determination of determining whether the manner of issuing ACKs needs to be adjusted: wherein the rate of issuing ACKs is determined according to formula $R = (T_{put\_DL}/N_{DL\_data\_size})/(T_{put\_UL}/N_{DL\_ACK\_size})$,
wherein R represents the rate of issuing ACKs, $T_{put\_DL}$ represents the transmission volume of the download link, $N_{DL\_data\_size}$ represents the size of each downloaded data packet packed in the physical layer, $T_{put\_UL}$ represents the transmission volume of the upload link, and $N_{DL\_ACK\_size}$ represents the size of each ACK.

8. The non-transitory storage medium according to claim 7, wherein when the rate of issuing ACKs is changed, the processor determines that the manner of issuing ACKs needs to be adjusted, and when the rate of issuing ACKs is unchanged, the processor determines that the manner of issuing ACKs does not need to be adjusted.

9. The non-transitory storage medium according to claim 8, wherein the manner of issuing ACKs is to issue one ACK in response to N downloaded data packets, wherein, when R is an integer, N is equal to R, and when R is a decimal, N is equal to 1 plus a nearest integer to which R is rounded down.

* * * * *